United States Patent [19]
Garnier

[11] 3,827,368
[45] Aug. 6, 1974

[54] BRAKING DEVICE OF A RESCUE APPARATUS FOR AN OVERHEAD CABLE TRANSPORT INSTALLATION

[75] Inventor: Marcel Garnier, Grenoble, France
[73] Assignee: Pomagalski S.A., Fontaine, France
[22] Filed: Feb. 1, 1973
[21] Appl. No.: 328,598

[30] Foreign Application Priority Data
Feb. 11, 1972  France ............................. 72.4777

[52] U.S. Cl. ................ 104/112, 105/150, 188/65.1, 104/113
[51] Int. Cl. .......................................... E01b 25/14
[58] Field of Search ......... 104/89, 91, 93, 112, 113, 104/114, 173, 202, 172 S, 211, 224; 105/148, 150; 188/33, 38, 41, 43, 65.1, 67

[56] References Cited
UNITED STATES PATENTS
3,353,503   11/1967   Pettit .................................. 104/112

Primary Examiner—M. Henson Wood, Jr.
Assistant Examiner—D. W. Keen
Attorney, Agent, or Firm—Stevens, Davis, Miller & Mosher

[57] ABSTRACT

A rescue apparatus comprising a carriage serving as a support for a seat, which can run by gravity on the carrier cable of an overhead cable installation. A brake system permits the regulation of the velocity downward travel on the cable. The carriage and the brake system are so devised as to permit the passing of the grips from which are suspended the loads on the cable and also of the towers.

7 Claims, 5 Drawing Figures

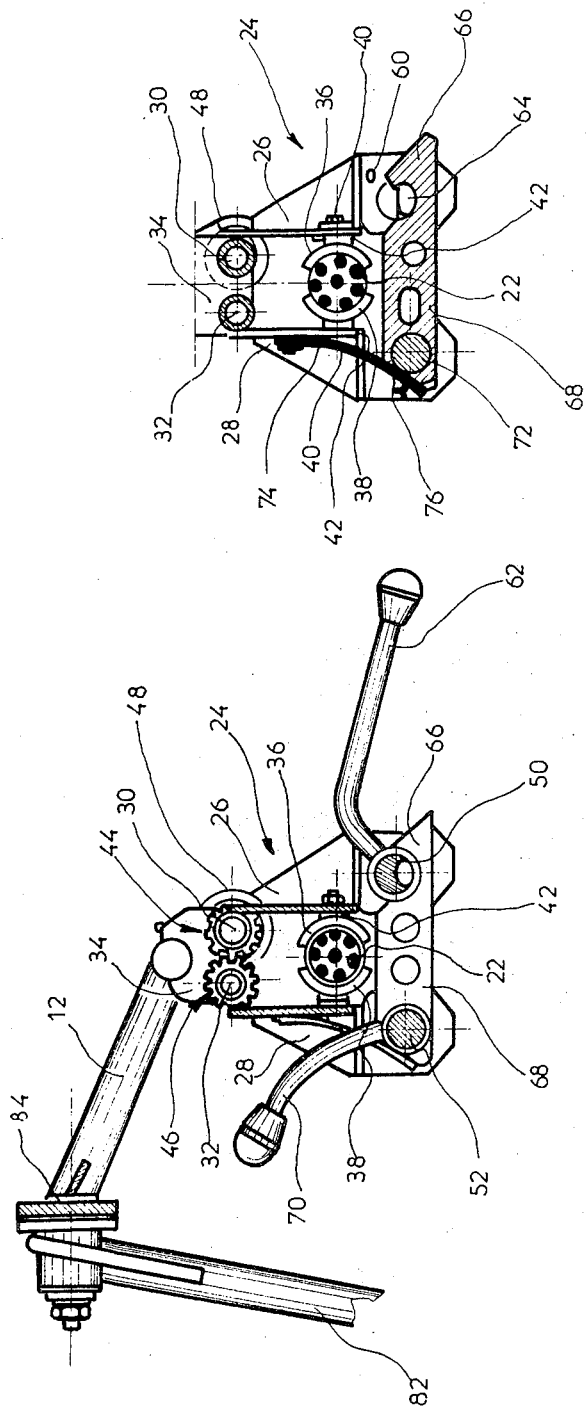

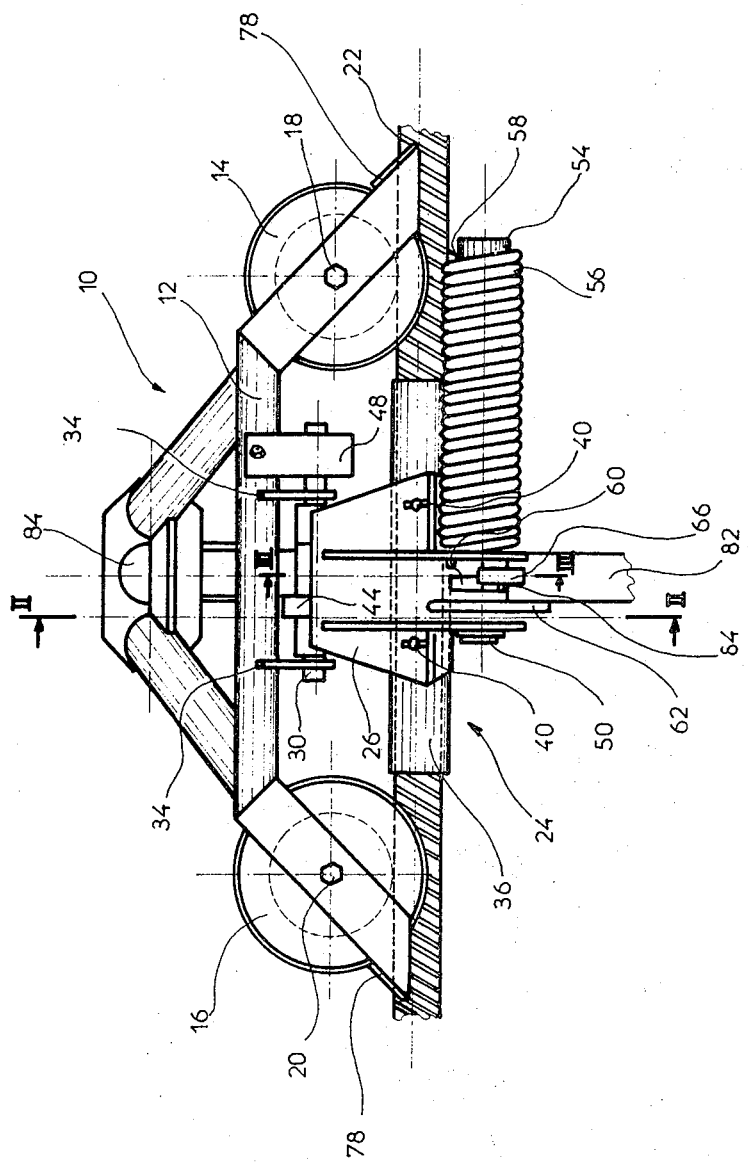

BRAKING DEVICE OF A RESCUE APPARATUS FOR AN OVERHEAD CABLE TRANSPORT INSTALLATION

The invention relates to a rescue apparatus for a transport installation with an overhead cable supported by spaced towers.

When there is an accidental breakdown the evacuation and rescue of passengers is generally difficult, particularly on uneven ground or in the mountains. The task of the rescuers becomes complicated in the case of an installation such as a gondola lift or a chairlift with a large number of gondolas or chairs on the cable.

The object of the present invention is to enable a rescuer to reach the vehicles easily and rapidly from the overhead cable.

Another object of the invention is to provide a braking system for a rescue apparatus which may be precisely controlled and having self-stopping characteristics.

Another object of the invention is the realization of a rescue apparatus that may be used on various types of installations with overhead cables.

The rescue apparatus makes use of the carrier cable only of the installation and may thus be put into service whatever may be the cause of the breakdown of the installation. The travel downwards along the cable is started from the upper terminal without involving any particular fatigue and in complete safety. The apparatus makes it possible to attain rapidly the successive vehicles.

Another object of the invention is the realization of an apparatus capable of passing the grips fixing the vehicles on to the cable, without removal of the apparatus from the cable. It will be shown more clearly from the description to follow that the crossing of the towers necessitates that these be specially equipped, which is easily realized in the case of towers which are not so equipped.

The apparatus can be used on mono-cable or bicable installations with one vehicle or a number of vehicles and it is readily adapted for use on cables of various diameters.

Other advantages and features will appear from the following description taken in conjunction with the accompanying drawings, in which:

FIG. 2 is a section on the line II—II of FIG. 4;

FIG. 3 is a section on the line III—III of FIG. 4;

FIG. 4 is an enlarged view in elevation of the upper part of the rescue apparatus according to the invention, which acts in conjunction with the support cable;

Figure 5:
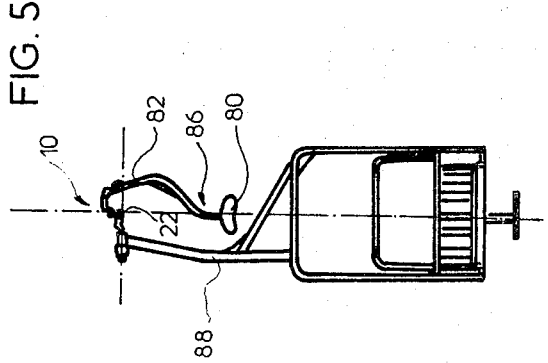
FIG. 5 is a schematic side-view of the installation according to FIG. 1 seen in the direction indicated by the arrow, which corresponds with the direction of travel of the cable.

Referring to the drawings, a carriage 10 has a frame 12 carrying two wheels 14, 16 loose fitted on spaced horizontal axles 18, 20 and the grooves of these wheels fit over the upper part of a cable 22 on which carriage 10 can run freely. Frame 12 of the carriage has a shoe brake system, designated by general reference 24, capable of gripping cable 22 and thus of braking or impeding the movement of carriage 10 on the cable.

Brake system 24 has two levers 26, 28 fitted so as to pivot respectively on spindles 30, 32 of frame 12 by means of bearings 34. Each of the levers 26, 28 has a jaw 36, 38 lined with a friction material in the form of a half-shell the inner diameter of which is appropriate to the section of cable 22, which can be compressed between half-shells 36, 38. The gripping jaws 36, 38 are fixed so as to be removable by means of screws 40 with the insertion of an elastic washer 42 of the type called Schnorr. Screws 40 pass through vertical slots which facilitate the self-centering of the jaws on the cable. The changing of worn jaws or friction linings is easy as is the adaptation of the apparatus to cables of various diameters by a simple changing of the jaws. The elastic washer 42 modulates the braking effort and ensures a gradual functioning of the brake.

Toothed sectors 44, 46 respectively co-axial with spindles 30, 32 are fixed to levers 26, 28 carrying the jaws, and impart, by mutual meshing, a symmetrical pivoting of the levers. A return spring 48, spiral for example, one end of which is secured to frame 12 and the opposite end to pivot spindle 30 tends to pull levers 26, 28 towards the position in which the jaws are open.

The free ends of levers 26, 28 opposite to spindles 30, 32 carry respectively spindles with eccentrics 50, 52 which are parallel with spindles 30, 32. Spindle 50 mounted so as to rotate on lever 26, is extended by a tubular part 54 on which is fitted a spiral or coil spring 56, one end 58 of which is secured to the end of extension 54 and of which the other end 60 is fixed to lever 26. On the spindle with eccentric 50 is fitted by means of a pin an operating lever 62 permitting the pivoting of spindle 50 while tensioning or releasing the tension on coil spring 56. The eccentric part 64 of spindle with eccentric 50 may be engaged to a hook 66 of a connecting bar 68 articulated on the eccentric part 72 of spindle with eccentric 52 of lever 28. On spindle with eccentric 52 is fixed by means of a pin a safety lever 70.

A plate-spring 74, acting in conjunction with the heel 76 of the connecting bar 68, holds the latter in its position of engagement of hook 66. In this engaged position the hook is in a stable position which prevents any untimely opening under the action of the tractive forces exerted on bar 68 by spring 56 through eccentric 64. When the brake 24 is in its normal or open position, spindle with eccentric 52 takes up the position shown in FIG. 3 in which eccentric part 72 is directed towards the opposite spindle with eccentric 50. The pivoting downwards of safety lever 70 thus brings about a rotation of spindle with eccentric 52, which results in the shortening of the connection between levers 26 and 28 by means of bar 68 and eccentric part 72. Inversely, spindle with eccentric 52 remains in the normal position should a tractive effort be exerted on bar 68. When the brake is in the normal or closed position, spindle with eccentric 50 positions eccentric part 64 downwards in a vertical plane, in such manner that any pivoting downwards of operating lever 62 produces an extension of the connection between levers 26 and 28 by bar 68 and spindle with eccentric 50, thus bringing about the opening of brake 24. A rotation of operating lever 62, in the opposite direction brings about on the contrary, the closing of jaws 36, 38. Coil spring 56 is so devised as to pull spindle with eccentric 50 in the direction of rotation opposite to that of the opening the jaws, that is to pull the brake into the braking position.

Before describing in detail the utilisation of this apparatus, it is useful to recall briefly the functioning of the braking system which constitutes the essential part of the apparatus. When hook 66 and the associated bar 68 are in the open position, the apparatus or carriage 10 may be placed on cable 22, jaws 36, 38 being held apart by return spring 48, which raises the levers carrying the jaws 26, 28 and the components supported in the occurrence spring 56 and operating and safety levers 62, 70. After installation of the carriage on the cable, levers carrying the jaws 26, 28 are lowered for example by a rotary movement applied to operating lever 62, the movement being transmitted by sectors 44, 46 to ensure symmetrical travel of levers 26, 28. The rotary movement of operating lever 62 brings about, after coming into contact of the jaws 36, 38 on cable 22, a rotation of spindle with eccentric 50 and the approach of the eccentric part 64 towards the opposite lever 28, to facilitate the hooking of hook 66. After engagement of hook 66, it is possible to free operating lever 62, which is brought by spring 56 into the position shown in FIG. 3, which corresponds with the clamping of brake 24.

The release of the brake is effected by the pivoting downwards of operating lever 62. The pivoting downwards of safety operating lever 70 exerts an additional traction on bar 68, which is transmitted by hook 66 to eccentric part 64. This additional traction brings about an additional braking and if the operating lever 62 is free a pivoting of spindle with eccentric 50 and the putting under increased tension of spring 56. There results from this an increased clamping force of jaws 36, 38. The speed of descent of carriage 10 may be regulated therefore by releasing the brake by means of operating lever 62, or should the braking action be insufficient, by additional braking resulting from the manipulation of safety lever 70. The frame 12 of carriage 10 is advantageously equipped with protection devices 78, fitted in front of the wheels, and which prevent these from passing over the hand of a user who might inadvertently take hold of cable 22.

A seat 80 is suspended from carriage 10 by means of a suspension 82 fitted so as to pivot on a journal 84 of frame 12, the pivoting being controlled by an adjustable braking system. Suspension 82 is in the form of a lateral stirrup permitting the passing, in a manner well known in itself, over components coupled on cable 22. Suspension 82 is equipped with a swivelling connection 86 which permits the fixing of the seat 80 in two opposite directions.

Figure 1:
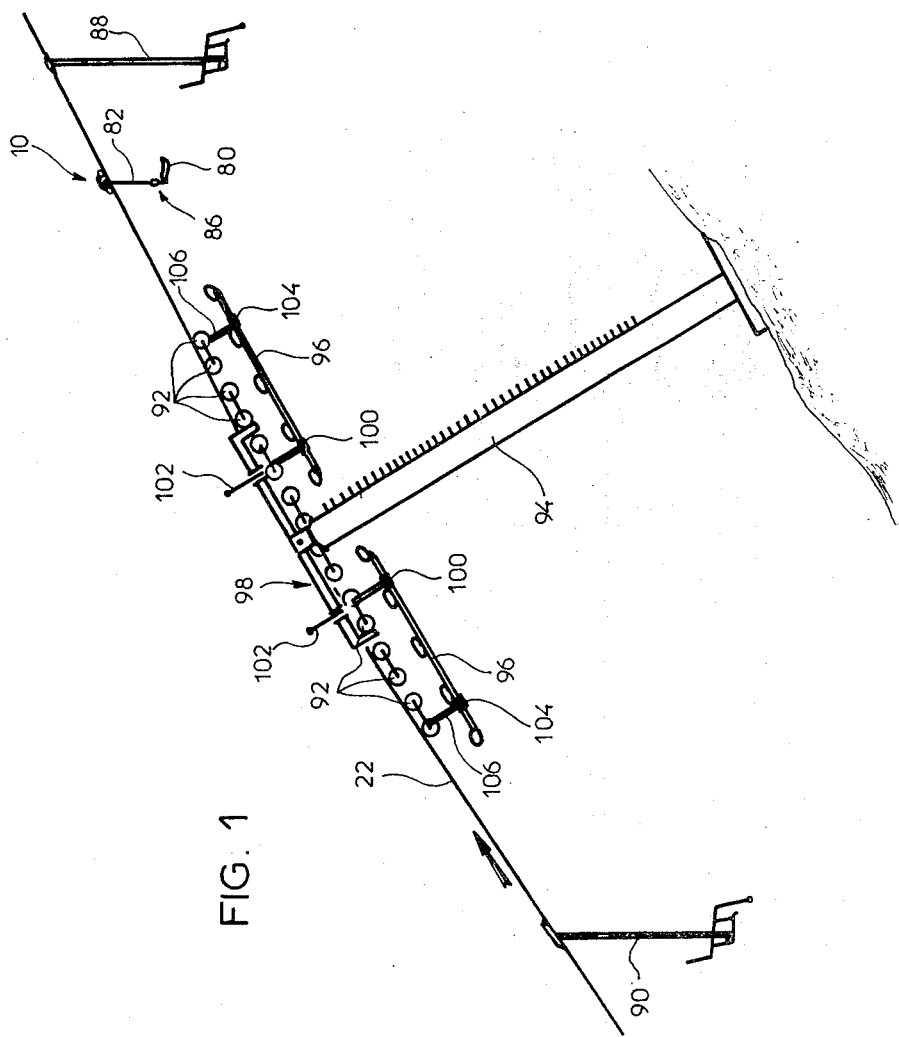
FIG. 1 is a schematic view in elevation of a section of an installation equipped to permit the use of a rescue apparatus according to the invention.

On referring more particularly to FIGS. 1 and 5, which represent an installation of the chairlift type, but which could of course well be a gondola lift, it will be seen that cable 22 carries chairs coupled on to the cable by means of grips well known in themselves and lateral suspensions 88, 90, which permit the passing over support sheaves 92 of towers 94 of the installation.

Each of the towers 94 is equipped with a walkway 96 which extends in the direction of cable 22 over practically the whole length of the train of support sheaves 92. The walkways may be fixed to the rocker system 98 by means of articulated rods, which do not hinder the pivoting of the rockers, and at the same time ensure a stable position of the walkway 96. Walkway 96 may for instance be hinged at one end 100 to a rigid bar 102 fixed on to the main rocker, the opposite end 104 being connected by means of a hinged rod 106 to the last rocker on the tower.

The rescue apparatus according to the invention is used in the following manner:

Should the chairlift come to a halt, the rescuer places carriage 10 on cable 22, in such a manner as to position suspension 82 on the side opposite to that of suspensions 88 of the chairs fixed to cable 22 (see FIG. 5). By swivelling articulation 86 he moves seat 80 so that it faces downwards, thus permitting the rescuer to observe the descent along cable 22. With the braking system brought into its working position by the hooking of hook 66 and moving safety lever 70 towards its gripping position, the rescuer installs himself on seat 80, raises lever 70 and starts the descent by gravity, by manipulating operating lever 62. On arriving at the first chair, he stops the movement of the carriage by applying brake 24, and rescues the passengers, for instance by lowering them to the ground with the aid of a winch or similar rescue device. Once the evacuation is completed, he releases brake 24 while holding on to suspension 88, and makes wheels 14, 16 pass over the grip of suspension 88. This is made possible by the symmetrical position of the stirrups of suspensions 82, 88 (see FIG. 5). After having passed over the grip he replaces hook 66 and pursues his descent along the cable as far as the next chair. The passing over a tower requires that the rescuer should leave his seat 80 and remove the apparatus from cable 22. For this, the rescuer stands on walkway 96 and frees the rescue device from cable 22. If necessary, he can replace it on cable 22 in the reverse position and slide it over sheaves 92, or simply carry it as he walks along the walkway to the other end of sheave train 92. He replaces the carriage on the cable and sets brake system 24 in the working position before sitting once more on seat 80 and continuing the rescue work.

It should also be noted that the walkway 96 also facilitates maintenance work on the rockers and sheave 92 by permitting an easy access to the end sheaves. The rescue may be carried out of course on the uphill or downhill side of the cable, carriage 10 being placed on the cable so as to permit passing over the grips of the chairs.

The rescue device is designed for one-hand operation, the other hand remaining free so that the rescuer can hold on safely. When hook 66 is engaged, carriage 10 is locked on cable 22 and cannot leave this even should wheels 14, 16 be derailed. The carriage is automatically locked when the rescuer is inactive or releases the levers. There is thus a perfect safety in operation.

What is claimed is:

1. A rescue apparatus for an overhead cable transport installation on a gradient wherein the cable is supported by arms fitted on spaced towers and supports loads coupled on the cable, comprising:
   a carriage with loose carrier wheels able to run on the cable,
   a lateral suspension articulated on the said carriage devised so as to provide sufficient clearance for the apparatus to pass by the loads,
   a braking system fixed on to the said carriage with a pair of mobile jaws able to grip the said cable and brake the running of the said carriage on the cable, mechanical means for mechanically linking the said jaws and having a first spindle with eccentric mounted so as to rotate for moving together or away the said mobile jaws and control braking, an operating lever fixed to the said first spindle with eccentric to impart a rotary movement to the spindle, an elastic means for biasing the said jaws into the braking position.

2. An apparatus according to claim 1, further comprising, associated with said jaws, respectively a first and a second jaw-holder lever each having two arms, one of which is pivotally mounted on the said carriage, the said mechanical linking means being designed to link the other arms of the first and second jaw-holder levers and to control the pivotment of the later levers, the said first spindle with eccentric being mounted so as to rotate on said other arm of said first jaw-holder levers.

3. An apparatus according to claim 2, further comprising:

a second spindle with eccentric mounted so as to rotate on said other arm of said second jaw-holder lever, a safety lever coupled with said second spindle with eccentric, a connecting rod mechanically linking the first and second spindles with eccentric so as to impart a moving away or together of the said other arms of the jaw-holder levers, when said operating lever is rotated in one direction or the other and a moving together of the said other arms when said safety lever is rotated.

4. An apparatus according to claim 3, comprising a seat and pivot fitting on the said suspension to permit the turning of the seat in the direction of travel of the carriage.

5. An apparatus according to claim 3, comprising a connecting rod mounted so as to rotate on one of the said spindles with eccentric and with a hook capable of engaging the other of the said spindles with eccentric.

6. An apparatus according to claim 5, comprising a mechanical link between the said jaw-holder levers to impart a symmetrical pivoting of the latter and an elastic component pulling the said jaw-holder levers into the position in which the jaws are separated.

7. An apparatus according to claim 1 for an overhead cable transport installation having walkways supported by said towers and extending along a section of said cable.

* * * * *